March 30, 1943.  A. M. MADLÉ  2,315,067

VARIABLE SPEED TRANSMISSION

Filed Sept. 22, 1941

INVENTOR.
ALAIN M. MADLÉ
BY John W. Michael
ATTORNEY.

Patented Mar. 30, 1943

2,315,067

UNITED STATES PATENT OFFICE 2,315,067

VARIABLE SPEED TRANSMISSION

Alain M. Madlé, Milwaukee, Wis., assignor to Graham Transmissions Inc., Milwaukee, Wis., a corporation of Delaware Application September 22, 1941, Serial No. 411,844

6 Claims. (Cl. 74—281)

This invention is an improvement in variable speed planetary transmissions of the friction type including longitudinally tapered planet rollers and an axially movable control ring encircling the rollers and adjustable lengthwise thereof to control their motion.

The present application is a continuation in part of my application for "Variable speed transmissions", filed March 11, 1940, Serial No. 323,320.

One structural type of such transmission includes a rotary carrier with the planet rollers having their small ends pivoted or fulcrumed on the rotary carrier and their large ends supported on the carrier so as to be constrained to radial swinging or tilting movement into pressure contact with the control ring. Means must be provided to force the planet rollers into pressure contact with their control ring in order that the requisite traction will be developed between the rollers and the ring.

The present invention proposes to utilize centrifugal force as the preponderant, or in some instances as the sole, source of force which develops pressure contact or traction between the rollers and their control ring. This is accomplished by attaching a non-planetary weight or block of appropriately substantial mass to the bearing for the large end of each roller. The weights or blocks are disposed as far distant as practicable from the axis of rotation of the carrier for the rollers, thereby establishing a maximum centrifugal radius and the maximum centrifugal force for any given R. P. M. And since the non-planetary blocks or weights are attached to the bearings at the large ends of the rollers, their centrifugal effect acts through the maximum leverage available. Consequently, the centrifugal moment of the non-planetary weights at the points of contact of the rollers and their control ring is many times greater than that of the planetary rollers at such points.

By utilizing the centrifugal force of a non-planetary weight as the principal or preponderant source of force to develop pressure contact between the rollers and their ring, a definite loading is had, the transmission is unloaded when not running, the control ring may be readily shifted lengthwise of the rollers, when the transmission is stationary, to pre-select the speed at which the transmission is to operate, and the transmission is rendered easy to assemble. And further, this permits the moment of inertia of the planetary rollers to be kept as small as possible. The use of a larger planetary roller and the larger moment of inertia in such rollers is obviously disadvantageous in transition periods. And the non-planetary weight may be varied without altering the geometry of the machine.

Other objects and advantages reside in certain novel features of the construction, arrangement, and combination of parts, which will be hereinafter more fully described and particularly pointed out in the appended claims, reference being had to the accompanying drawing forming a part of this specification, and in which:

Figure 1:
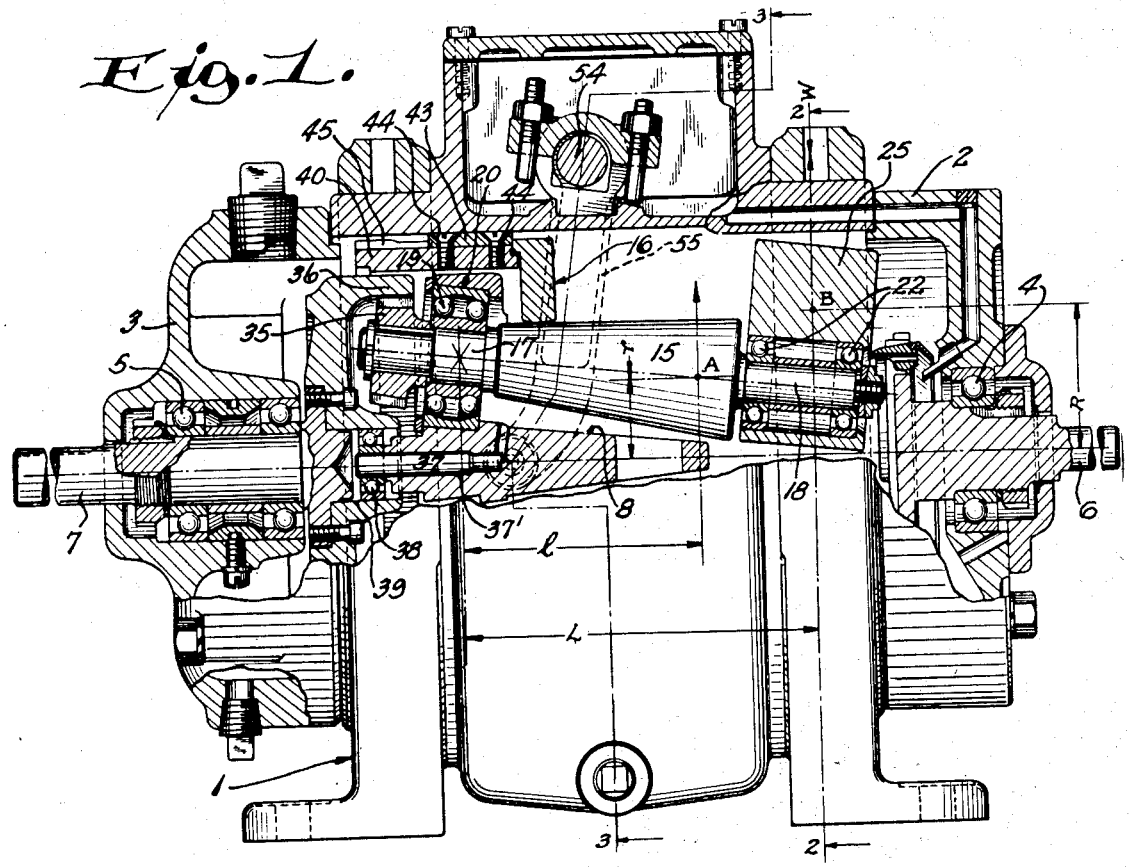
Figure 1 is a view in central, vertical, longitudinal cross section showing a transmission constructed in accordance with the present invention, parts being shown in elevation for the sake of illustration.
Figure 2:
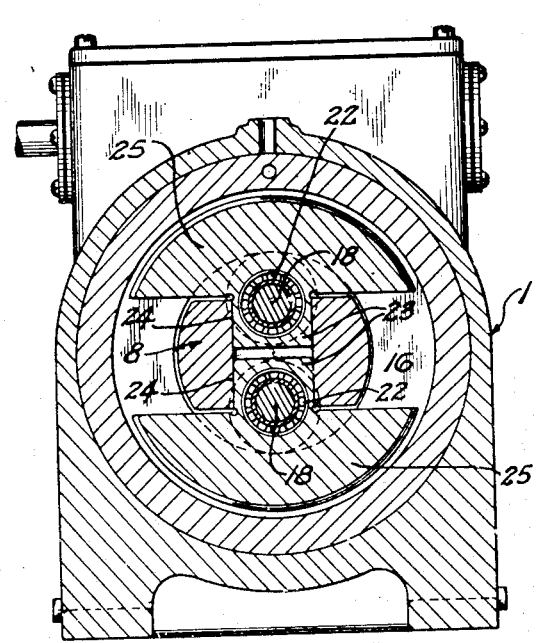
Figure 2 is a view taken in transverse, vertical cross section on line 2—2 of Figure 1.

Referring to the drawing, it will be seen that a variable speed planetary transmission embodying the present invention comprises a housing designated generally at 1, and having removable end plates 2 and 3 carrying the ball bearing assemblies 4 and 5 for the in-put and out-put shafts designated at 6 and 7, respectively. A rotary carrier designated generally at 8 is supported for rotation in the housing 1 and is operatively interrelated with the in-put and out-put shafts 6 and 7.

Two longitudinally tapered or conical planetary rollers designated at 15 are mounted on the rotary carrier 8 for rotation therewith and with respect thereto, and for tilting or rocking movement transversely or radially thereof.

A control or traction ring 16 encircles the planet rollers 15 and is axially shiftable lengthwise thereof to control their motion.

Each roller 15 is provided with journals or trunnions 17 and 18 at its ends. A spherical bearing assembly 19 cooperates with the trunnion 17 of each roller 15 and is in turn supported and releasably secured in an opening 20 provided therefor in the adjacent end plate 9 of the carrier.

The bearing assembly 19 is designed to support the planet roller for rotation about its own axis, and for rocking or tilting movement transversely or radially with respect to the rotary carrier. For this purpose each bearing assembly 19 may have its outer race provided with a spherical inner surface engageable with the balls in a manner common in this type of ball bearing, or its outer race may have a spherical outer surface slidably interfitted with a correspondingly formed wall of the opening 20.

Each trunnion 18 at the large end of each planetary roller 15 is supported for rotation in a double ball bearing assembly 22, which in turn is mounted in a guide block or bearing support 23. Each guide block or bearing support 23 is slidably fitted in a radial slot or guide-way provided therefor in the rotary carrier 8, the slot or guideway 24 extending diametrically through the carrier at the end thereof adjacent the in-put shaft 6.

Each guide block or bearing support 23 has integrally formed therewith, or suitably attached thereto, a weight 25. The weights are integral with or attached to the outer portions of the guide blocks, and preferably are in the form of segments of a circle, the weights overhanging the guide blocks 24 and having their outer peripheries closely adjacent to, though slightly spaced from, the end wall of the housing 1. By combining these weights in this manner with the guide blocks they are non-planetary in character for they do not rotate with the rollers and hence they may be eccentrically disposed without unbalancing the rollers, and moreover they are so located as to exert the maximum centrifugal effect and may be given the appropriate dimensions.

Just beyond each bearing 19 each trunnion 17 has a planet pinion 35 keyed or otherwise fixed thereto. The two planet pinions 35 mesh with an internal ring gear 36 which may be formed integral or otherwise suitably fixed to the output shaft 7.

The end of the rotary carrier 8 adjacent the ring gear 36 is supported thereon, and for this purpose a stud shaft 37 is provided and has a portion press-fitted into an opening 37' in the carrier 8. A projecting portion of the said shaft 37 is piloted into the ring gear 36 in that it is mounted in a roller bearing 38 supported in a recess 39 in the hub portion of the ring gear 36.

Figure 3:
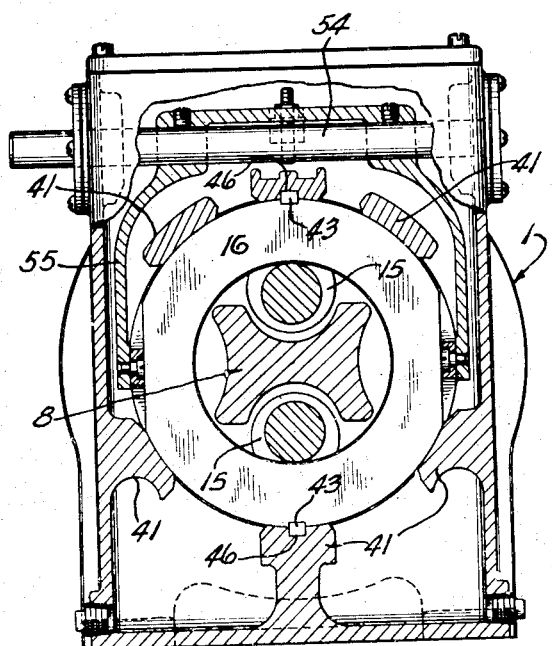
Figure 3 is a view in transverse, vertical, cross section taken on line 3—3 of Figure 1, with parts shown in elevation for the sake of simplicity in illustration.

The traction or control ring 16 is formed at one end with an annular or band-like structure 40, which is of considerable length in order to afford the desired bearing contact essential to prevent canting or cocking of the ring. The band-like structure of the control ring is slidably supported on appropriately machined guide-ways or lands 41 provided therefor on the interior of the housing 1 and is constrained to sliding motion and held against rotation by means of keys 43 secured with screws 44 and key-ways 45 provided therefor in the periphery of the band-like structure 40, the keys 43 also being slidably interfitted in key-ways 46 provided therefor on certain of the guide-ways or lands 41, as clearly shown in Figures 1 and 3.

The control ring may be adjusted from a rotatable operating or control shaft 54 having a yoke 55 operatively interrelated with the control ring. Details of the control means per se form no part of the present invention, and are fully shown and described in my U. S. Letters Patent 2,178,399, granted October 31, 1939.

On Figure 1 the point A is the resultant point of the summation of the centers of gravity of the planetary roller 15 and the parts associated therewith and partaking of a planetary motion; the point B is the resultant point of the summation of the centers of gravity of the non-planetary guide block 23 and the non-planetary weight 25. In the typical design illustrated, the centrifugal weight W of the non-planetary block 25 effective at the point B is nearly five times as great as the centrifugal weight $w$ of the planetary roller 15 effective at the point A. It is to be noted that this arises not only from the greater relative mass of the non-planetary block as compared to that of the planetary roller, but to its greater distance R from the central axis as compared to $r$. In addition, the centrifugal weight W of the non-planetary block acts through the lever arm L which is considerably greater than the lever arm $l$ of the centrifugal weight $w$ of the planetary roller. As a consequence, the loading moment WL of the non-planetary weight is approximately seven times as great in the actual commercial design illustrated as the loading moment $wl$ of the planetary roller. In other words, approximately seven-eighths of the tractional pressure effective at the point of contact between the ring and roller is here derived from the non-planetary weight.

While I have shown and described one construction in which the invention may be advantageously embodied, it is to be understood that the construction shown has been selected merely for the purpose of illustration or example, and that various changes in the size, shape, and arrangement of the parts may be made without departing from the spirit of the invention or the scope of the subjoined claims.

I claim:

1. A variable speed transmission of the character described comprising a rotary carrier, an axially movable control ring, a plurality of inclined conical planetary rollers, a bearing supporting the small end of each roller on the carrier for rotation therewith and with respect thereto and for rocking movement into pressure contact with said ring, said carrier having a radial guideway adjacent the large ends of the rollers, a bearing for the large end of each roller, a bearing block carrying each of said last-named bearings and fitted for radial sliding movement in the adjacent radial guideway, and means utilizing centrifugal force to develop pressure contact between said rollers and said ring, and including a non-planetary weight fixed to each of said bearing blocks, and constituted to provide a centrifugal effect greater than that of the planetary rollers.

2. A variable speed transmission of the character described comprising a rotary carrier, an axially movable control ring, an inclined planetary roller, means supporting the small end of the roller on the carrier for rotation therewith and with respect thereto and for tilting movement in a radial plane into engagement with said ring, a bearing for the large end of the roller, and means utilizing centrifugal force as the entire source of force to develop pressure contact between said roller and said ring and including a non-planetary weighted block fastened to said bearing and constituted to provide a centrifugal effect substantially greater than that of the planetary roller.

3. A variable speed transmission of the character described comprising a rotary carrier, an axially movable control ring, an inclined conical planetary roller, means supporting the small end of the roller on the carrier for rotation therewith and with respect thereto and for tilting movement into engagement with said ring, means coacting with the large ends of the roller and the carrier to constrain the roller to rotate with the carrier and to tilting movement in a radial plane into pressure contact with said ring, and means utilizing centrifugal force to develop pressure contact between said roller and said ring and including an eccentric non-planetary weight connected to the large end of the roller and constituted to provide a centrifugal effect substantially greater than that of the planetary roller.

4. A variable speed transmission of the character described comprising a rotary carrier, an axially movable control ring, an inclined conical planetary roller having the small end fulcrumed on the carrier and constrained at its large end for tilting movement in a radial plane into pressure contact with the ring, and means utilizing centrifugal force as the entire source of force to develop pressure contact between said roller and said ring and coacting with the large end of the roller and constituted to exert on the large end of the roller a centrifugal force of a magnitude substantially greater than that of the planetary roller.

5. A variable speed transmission of the character described comprising a rotary carrier, an axially movable control ring, an inclined conical planetary roller having its small end fulcrumed on the carrier and constrained at its large end to tilting movement in a radial plane into pressure contact with the ring, and means utilizing centrifugal force as the source of force to develop pressure contact between said roller and said ring and including a non-planetary weight interconnected with the large end of the roller and constituted to exert centrifugal force on the large end of the roller of a magnitude substantially greater than that of the planetary roller.

6. A variable speed transmission of the character described comprising a rotary carrier, an axially movable control ring, an inclined conical planetary roller having its small end fulcrumed on the carrier, a bearing for the large end of the roller, and means utilizing centrifugal force to develop pressure contact between the roller and the ring and including a guide block for said bearing supported on the carrier for sliding movement radially with respect thereto, and an eccentric non-planetary weight fixed to the guide block and applying centrifugal force to the large end of the roller in an amount substantially greater than that of the planetary roller.

ALAIN M. MADLÉ.